(No Model.)
A. BEALE.
TELEPHONE TRANSMITTER.
No. 342,775. Patented June 1, 1886.
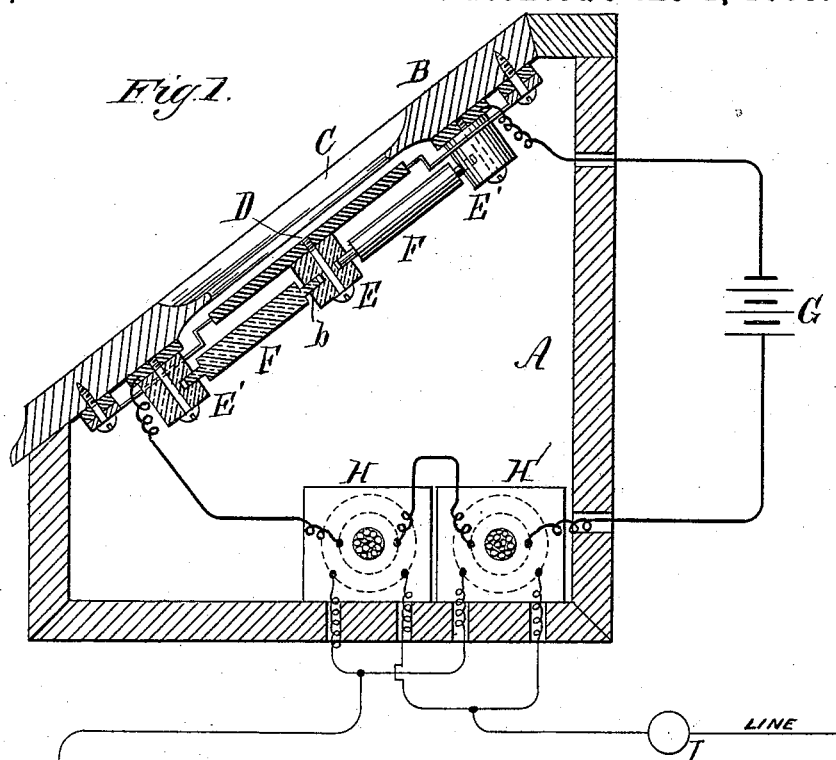
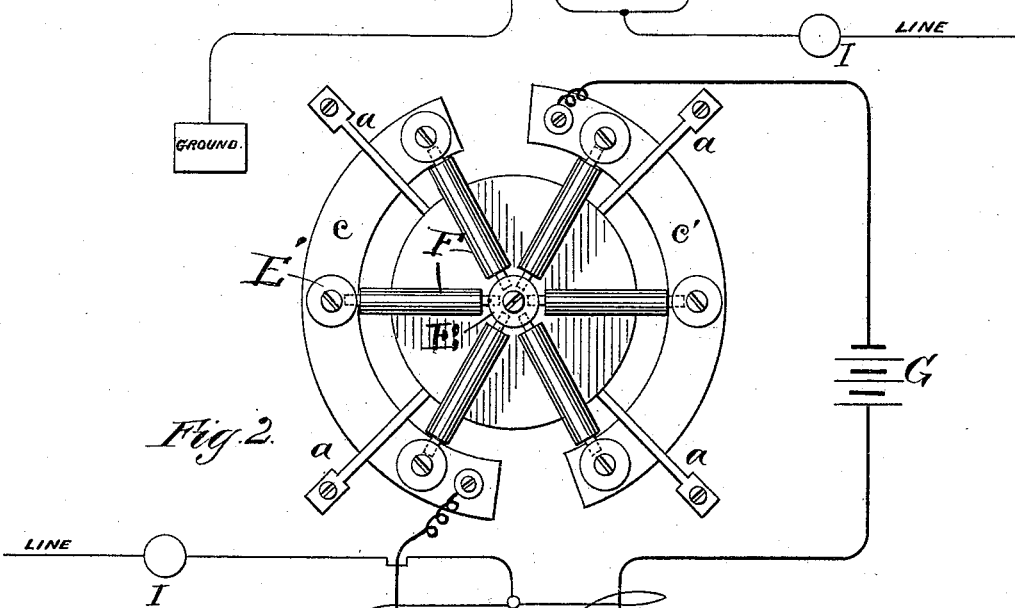
Witnesses.
H. F. Parker
[signature]
Inventor
A. Beale,
By
Geo. M. Hopkins,
Atty.

UNITED STATES PATENT OFFICE.

ALFRED BEALE, OF NEW YORK, N. Y., ASSIGNOR TO HIMSELF, L. B. CLARK, OF SAME PLACE, AND E. R. WIGGIN, OF BOSTON, MASSACHUSETTS.

TELEPHONE-TRANSMITTER.

SPECIFICATION forming part of Letters Patent No. 342,775, dated June 1, 1886.

Application filed November 13, 1885. Serial No. 182,652. (No model.)

*To all whom it may concern:*

Be it known that I, ALFRED BEALE, of New York, county and State of New York, have invented a new and useful Improvement in Telephone-Transmitters, of which the following is a specification, reference being had to the annexed drawings, forming a part thereof, in which—

Figure 1 is a vertical transverse section of a telephone-transmitter constructed according to my invention; and Fig. 2 is a view of the under side of the diaphragm, showing the electrical connections diagrammatically.

The object of my invention is to provide a telephone-transmitter which will be sensitive to light sounds, and will be capable of being operated by a strong battery without injury to the electrodes.

My invention consists in the construction and novel arrangement of parts hereinafter described, illustrated in the drawings, and pointed out in the claims hereto appended.

The transmitter-case A is provided with a mouth-piece, B, also forming the lap thereof, which is inclined at an angle of approximately forty-five degrees, and has a central opening, C.

Opposite the opening C, and in the casing A, is supported a diaphragm, D, by springs $a$, which extend out radially, and are attached to the under surface of the mouth-piece B. The diaphragm D is larger than the opening C in the mouth-piece, and is removed a short distance from it, so that it may vibrate under the influence of air-vibrations without touching the mouth-piece.

To the center of the diaphragm D is secured a post, E, of carbon or other suitable material, having formed in its sides sockets $b$, for receiving the cylindrical carbon electrodes F. The cylindrical carbon electrodes F extend radially from the post E, parallel with the diaphragm D, and beyond its periphery, and tenons formed on the outer ends of the electrodes are received in sockets in the posts E'. The posts E' are secured to the under surface of the mouth-piece B, with the metallic plates $c\ c'$ intervening. In the present case I have shown six cylindrical electrodes, F, and two metallic plates, $c\ c'$, the outer ends of three of the cylindrical electrodes being connected by the posts E' with the plate $c$, the remaining three being connected with the plate $c'$. The primary circuit includes the electrodes F, the battery G, and the induction-coils H H'. One pole of the battery G is connected with the plate $c'$. The other pole is connected with one end of the primary wire of the induction-coil H', the other end of the primary of this coil being connected with the primary wire of the induction-coil H, the remaining terminal of the primary wire of the induction-coil H being connected with the plate $c$. The induction-coils are thus placed in a primary circuit in series. The corresponding terminals of the secondary wires of the induction-coils H H' are connected with the ground. The opposite terminals are both connected with the line which includes the receiver I. The secondary wires of the induction-coils are in this way connected in parallel circuit. By means of this arrangement of the primary and secondary circuits I am enabled to produce a powerful effect upon the line, and at the same time to reduce the resistance through the secondary circuit one-half.

The diaphragm D, under the influence of air-vibrations, moves bodily, and the tenons on the ends of the cylindrical carbon electrodes F being slightly smaller than the sockets into which they are fitted, permit of the free vibration of the diaphragm upon the springs $a$, and the inner ends of the electrodes F, which are carried by the diaphragm, necessarily move with the diaphragm, while the outer ends of the electrodes move in the posts E' as pivotal points. By means of this construction I secure great amplitude of vibration in the diaphragm D, and a great variation of the current flowing through the electrodes F without any marked interruptions. The inclined position of the mouth-piece and the diaphragm and electrodes connected therewith also assists in preserving the contact of the electrodes with the post E, so that while the great variation of the current is secured there can be no jarring or breaks. This construction enables me to employ a large current in the primary circuit without injury to the electrodes.

Having thus described my invention, what I claim as new, and desire to secure by Letters Patent, is—

1. In a telephone-transmitter, the combination of the inclined mouth-piece B, having the central orifice, C, the diaphragm D, connected to the mouth-piece by the radial spring a, the radial electrodes F, having their inner ends supported by the central post, E, of the diaphragm, and their outer ends by the posts E', the curved metallic plates c c', and the lines of wires, substantially as described, to bring said plates in electric circuit.

2. In a telephone-transmitter, the combination of the inclined mouth-piece B, the diaphragm D, the spring a, suspending the diaphragm from the mouth-piece, the radial electrodes F, supported by the posts E E', the plates c c', the primary circuit provided with one or more coils, and having the battery G, and receiver I within it, and the secondary circuit having the surrounding coils H H', all constructed and arranged substantially as and for the purpose specified.

ALFRED BEALE.

Witnesses:
DAVID K. CASE,
GEO. M. HOPKINS.